UNITED STATES PATENT OFFICE.

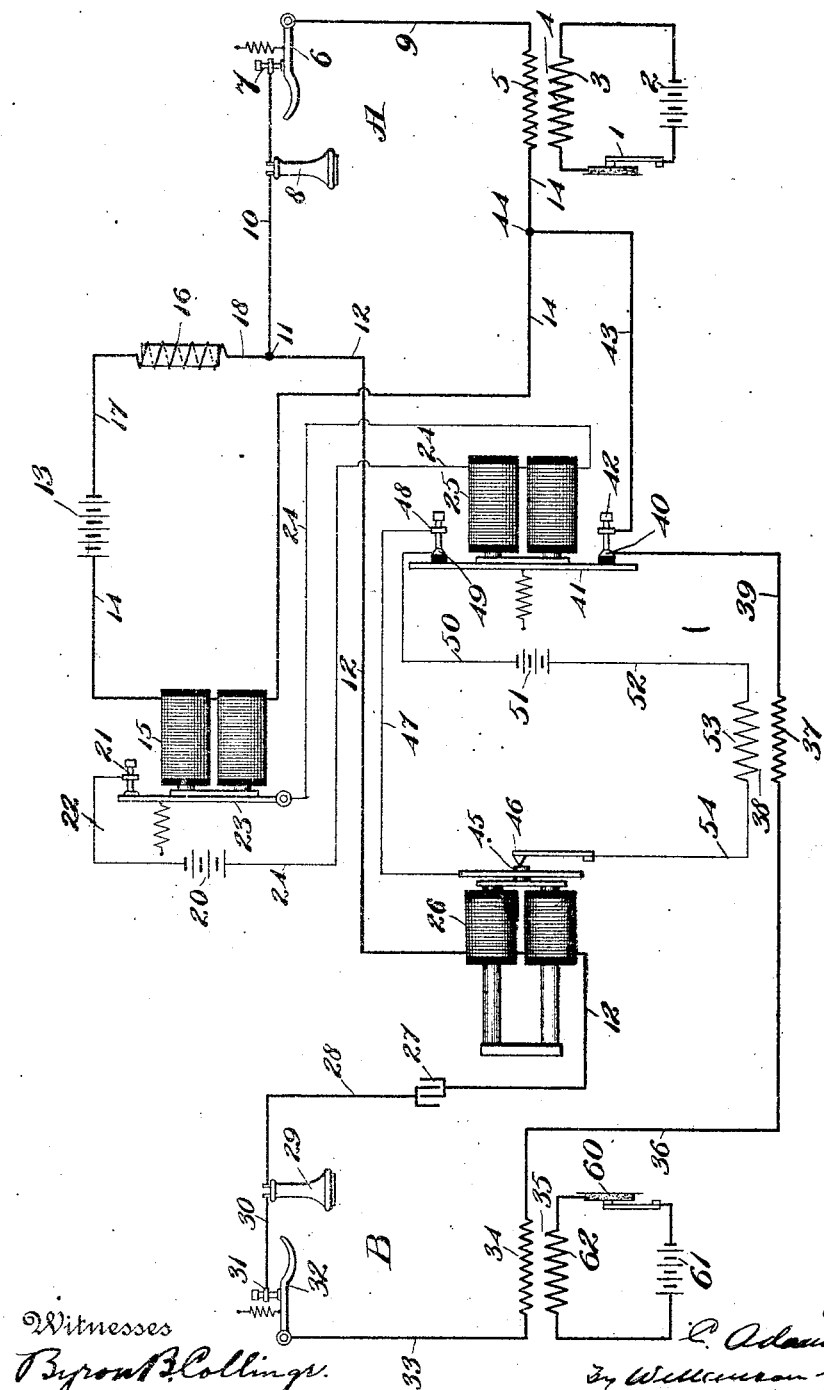

CHARLES ADAMS-RANDALL, OF NEW YORK, N. Y., ASSIGNOR TO RANDALL TELEPHONE MANUFACTURING COMPANY, OF AUGUSTA, MAINE, A CORPORATION OF MAINE.

TELEPHONE REPEATING APPARATUS AND CIRCUITS.

1,017,616.     Specification of Letters Patent.     Patented Feb. 13, 1912.

Application filed March 13, 1911. Serial No. 614,188.

*To all whom it may concern:*

Be it known that I, CHARLES ADAMS-RANDALL, a citizen of the United States, residing at New York, in the county of New York and State of New York, have invented certain new and useful Improvements in Telephone Repeating Apparatus and Circuits; and I do hereby declare the following to be a full, clear, and exact description of the invention, such as will enable others skilled in the art to which it appertains to make and use the same.

This invention relates to telephone repeating apparatus and circuits, and has for its object to improve the transmission in those toll lines which are usually connected in manually at the switch-board.

With these and other objects in view, the invention consists in the novel arrangement of circuits and apparatus more fully hereinafter disclosed and particularly pointed out in the claims.

Referring to the accompanying illustrations forming a part of this specification, the figure is a diagrammatic view of an arrangement of circuits and apparatus illustrative of my invention.

1 indicates any suitable transmitter, 2 a source of current connected therewith, and 3 the primary of an induction coil 4 of which 5 is the secondary.

6 represents the usual hook supporting the receiver at a calling station, and 7 a contact co-acting with said hook.

8 represents any suitable form of receiver, 9 a connection between one end of the secondary 5 and the said hook 6, and 10 a connection between the contact 7 and the point 11 on the main line 12.

13 represents a main battery connected to the wire 14 passing through the coils of the relay 15 and joining the other end of the secondary 5, as shown. The said battery 13 is also connected with the impedance 16 by the wire 17, as illustrated. The said impedance 16 is also joined to the point 11 by the connection 18.

20 represents a local battery, joined to the contact 21 by the wire 22, and 23 represents the armature of the relay 15 joined by the wire 24 passing through the coils of the controller 25 and completing the circuit with the battery 20.

The main line wire 12 passes through the coils of a repeater 26 and is connected with the condenser 27 as shown. The said condenser is joined by the wire 28 to the receiver 29 at a distant station, and said receiver is joined by the wire 30 to a contact 31 co-acting with the usual hook 32, which in turn is joined by the wire 33 to one end of the secondary 34 of the induction coil 35. The other end of said induction coil is joined by the wire 36 to one end of the secondary 37 of the induction coil 38, while the other end of said secondary 37 is joined by the wire 39 to the contact 40 under the control of the armature 41 of the controller 25. Associated with the contact 40 is an adjustable contact point 42 joined as at the point 44 by the wire 43 to the wire 14.

45 and 46 represent variable contacts under the control of the repeater 26, and the contact member 45 is joined by the wire 47 to the contact member 48 associated with the contact member 49 under the control of the armature 41 of the controller 25, and said contact member 49 is joined by the wire 50 to the local battery 51 which in turn is joined by the wire 52 to one end of the primary 53 of the induction coil 38, while the other end of said primary is joined by the wire 54 to the contact member 46 of the repeater 26.

The operation of my improved system is as follows:—A person at the station A wishing to converse with person at the station B after calling in the usual way simply takes the receiver 8 off of the hook 6, whereupon said hook will automatically close the circuit at the contact point 7, and current will flow from the battery 13 along the wire 14 through the coils of the relay 15, to and through the secondary 5 of the induction coil 4, along the wire 9, the said hook 6, contact 7, wire 10, connection 18, impedance 16 and wire 17 back to the battery 13. Current flowing through the relay 15 will cause its armature 23 to close circuit at the contact 21, whereupon current will flow from the local battery 20 along the wire 22 across the contact 21, along the armature 23, and along the wire 24, through the coils of the controller 25 and back to the battery 20. Currents passing through the coils of the controller 25 will cause its armature 41 to close the circuit at the contacts 40 and 49, as illustrated, and the system will be ready for conversation. The transmitter 1 at station A may be now talked into, and induced currents from the secondary 5 will traverse the wire 9, lever 6, contact 7, wire 10, main line wire 12, coils of the repeater 26, and flow into the condenser 27. Similar currents will leave the condenser 27, traverse the wire 28, receiver 29 at the distant station B, wire 30, contact 31, hook lever 32, wire 33, secondary 34, wire 36, secondary 37, wire 39, contact members 40 and 42, wire 43 to the point 44, and thence over the wire 14 back to the secondary 5 of the induction coil 4. These voice caused currents traversing the receiver 29 will of course, reproduce the original speech in said receiver. These currents also traversing the repeater 26 will vary the resistance between the contact members 45 and 46, and thereupon vary the current flowing from the battery 51 through said contacts, and through the primary 53 of the induction coil 38. These latter variable currents corresponding to the original voice caused currents will react upon the secondary 37 of the said coil 38, and thereupon induce in said secondary 37 additional currents corresponding to the original voice caused currents, which will strengthen the latter and cause the speech to become clearer in the receiver 29. In all cases it is desirable to have a calling circuit (not shown) between the two stations, which calling circuits may be of any suitable and well known character, and when the call is received, of course, each party takes his receiver off of its respective hook, and thereupon brings the circuits into the condition illustrated. Should it be desired to talk from the station B to the station A, a call is made as before, whereupon the listener at the station A takes his receiver 8 off of the hook 6, and brings the circuits into the condition shown. Thereupon the person talking at the station B may utter words into the transmitter 60 and cause currents from the battery 61 to traverse the secondary 62 of the coil 35. These currents will cause similar currents to leave one end of the coil 34, to flow along the wire 36, the secondary 37, the wire 39, the contact members 40 and 42, wire 43, to the point 44, wire 14, secondary 5, wire 9, hook 6, contact 7, wire 10, point 11, main line wire 12 and coils of the repeater 26 into the condenser 27. Similar currents will flow out of the condenser 27 along the wire 28, receiver 29, wire 30, contact 31, lever 32, and wire 33, back to the other end of the said secondary 34. In like manner, these voice caused currents in traversing the coils of the repeater 26 will cause similar currents to flow from the battery 50 through the primary 53, and these latter currents in the primary 53 will induce similar currents in the secondary 37 of the coil 38, which will render the speech clearer in the receiver 8 at the station A.

When the receivers are on the hooks, of course, all circuits are broken, as will be apparent from the drawings.

It is obvious that those skilled in the art may vary the arrangement of parts without departing from the spirit of my invention, and therefore I do not wish to be limited to the disclosure above except as may be required by the claims.

What I claim is:—

1. In a telephone system, the combination of a main line metallic circuit; a condenser in series in said circuit; a repeater coil in series in one side of said circuit; a coil in series in the other side of said circuit; a local repeating circuit having a coil in inductive relation to said second mentioned coil, and magnetic means for making and breaking said local circuit, substantially as described.

2. In a telephone system, the combination of a main line metallic circuit; magnetic means for making and breaking said circuit; means at one of the terminals of said circuit for controlling said magnetic means; a repeater coil in series in one side of said circuit; a coil in series in the other side of said circuit; and a local repeating circuit having a coil in inductive relation to said second mentioned coil, substantially as described.

3. In a telephone system, the combination of a main line metallic circuit; magnetic means for making and breaking said circuit; a relay for controlling said magnetic means; means located at one of the terminals of said circuit adapted to control said relay; a repeater coil in series in one side of said circuit; a coil in series in the other side of said circuit; and a local repeating circuit having a coil in inductive relation to said second mentioned coil, substantially as described.

4. In a telephone system, the combination of a main line circuit; a controller for making and breaking said circuit; a relay and circuit controlled from one of the terminals of said circuit for operating said controller; an impedance in said relay circuit; a repeater coil in series with one side of said main line circuit; a local repeating circuit in inductive relation with said main line circuit; and a coil associated with said local circuit in series in the other side of said main line circuit, substantially as described.

5. In a telephone system, the combination of a main line circuit; a condenser in series with said circuit; a controller for making and breaking said circuit; a relay and circuit for operating said controller actuated from one of the terminals at will; an impedance in said relay circuit; a repeater coil in series with one side of said main line circuit; and a local repeating circuit in inductive relation with the other side of said main line circuit, substantially as described.

6. In a telephone system, the combination of a main line circuit; a plurality of manually controlled contacts for making and breaking said circuit; a condenser in series in said circuit; a controller for making and breaking said circuit; a relay and circuit for operating said controller; an impedance in said relay circuit; a repeater coil in series with one side of said main line circuit; and a local repeating circuit governed by said controller in inductive relation with the other side of said main line circuit, substantially as described.

In testimony whereof, I affix my signature, in presence of two witnesses.

CHARLES ADAMS-RANDALL.

Witnesses:
I. W. SMITH,
FREDERICK B. BLACKMAN.